United States Patent
Stanasolovich et al.

(10) Patent No.: US 10,659,926 B1
(45) Date of Patent: May 19, 2020

(54) SENSOR PLATFORM FOR GEOMETRIC PHYSICAL AREA

(71) Applicant: Intel Corporation, Santa Clara, CA (US)

(72) Inventors: David Stanasolovich, Phoenix, AZ (US); Craig Owen, Folsom, CA (US); Catherine W. Spence, Merrimack, NH (US); Eddie Balthasar, Bellingham, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/654,996

(22) Filed: Oct. 16, 2019

Related U.S. Application Data (63) Continuation of application No. 15/024,933, filed as application No. PCT/US2013/077153 on Dec. 20, 2013, now abandoned.

(51) Int. Cl.
| | |
|---|---|
| *H04W 4/02* | (2018.01) |
| *H04W 4/029* | (2018.01) |
| *H04W 4/021* | (2018.01) |
| *G06F 16/29* | (2019.01) |

(52) U.S. Cl.
CPC ............ *H04W 4/029* (2018.02); *G06F 16/29* (2019.01); *H04W 4/021* (2013.01)

(58) Field of Classification Search
CPC .................................. H04W 4/02; G06F 16/29
See application file for complete search history.

(56) References Cited

U.S. PATENT DOCUMENTS

| | | | |
|---|---|---|---|
| 10,025,964 B2* | 7/2018 | High | G06K 7/10762 |
| 2002/0178085 A1 | 11/2002 | Sorensen | |
| 2007/0185756 A1 | 8/2007 | Ahn | |
| 2008/0059297 A1 | 3/2008 | Vallier et al. | |
| 2008/0245863 A1 | 10/2008 | Buchheit | |
| 2009/0224970 A1 | 9/2009 | Tsau | |
| 2010/0070369 A1 | 3/2010 | Fenton et al. | |
| 2011/0028160 A1 | 2/2011 | Roeding et al. | |
| 2011/0276385 A1 | 11/2011 | Keller | |

(Continued)

FOREIGN PATENT DOCUMENTS

| | | |
|---|---|---|
| CN | 101006445 | 7/2007 |
| CN | 102667839 | 9/2012 |

(Continued)

OTHER PUBLICATIONS

"International Application Serial No. PCT US2013 077153, International Search Report dated Sep. 18, 2014", 5 pgs.

(Continued)

*Primary Examiner* — Michael T Vu
(74) *Attorney, Agent, or Firm* — Schwegman Lundberg & Woessner, P.A.

(57) ABSTRACT

Systems and techniques for a sensor platform for a geometric physical area are described herein. The sensor platform combines sensors installed in the physical area with transient sensors on people and articles within the area. This collaborative sensor data may then be used to identify interactions between people and articles and react by using these interactions to locate documents based on the person, the article, and the interaction within the geometric physical area.

20 Claims, 5 Drawing Sheets

(56) References Cited

U.S. PATENT DOCUMENTS

| | | | |
|---|---|---|---|
| 2012/0246684 | A1 | 9/2012 | Yarvis et al. |
| 2013/0268316 | A1 | 10/2013 | Moock et al. |
| 2014/0365273 | A1 | 12/2014 | Hurewitz |
| 2015/0025967 | A1 | 1/2015 | Ellison |
| 2015/0081418 | A1 | 3/2015 | Sahai |
| 2016/0127867 | A1* | 5/2016 | Wang .............. H04W 4/023 455/456.3 |
| 2016/0171577 | A1* | 6/2016 | Robinson, Jr. ..... G06Q 30/0613 705/7.13 |
| 2016/0247218 | A1 | 8/2016 | Stanasolovich et al. |

FOREIGN PATENT DOCUMENTS

| | | |
|---|---|---|
| CN | 105793880 | 7/2016 |
| JP | 3941402 | 7/2007 |
| JP | 2013073489 | 4/2013 |
| KR | 1020120000709 | 1/2012 |
| WO | 2012009532 | 1/2012 |
| WO | 2015094361 | 6/2015 |

OTHER PUBLICATIONS

"International Application Serial No. PCT US2013 077153, Written Opinion dated Sep. 18, 2014", 6 pgs.

"International Application Serial No. PCT US2013 077153, International Preliminary Report on Patentability dated Jun. 30, 2016", 8 pgs.

"European Application Serial No. 13899687.1, Extended European Search Report dated Apr. 12, 2017", 7 pgs.

"European Application Serial No. 13899687.1, Response filed May 18, 2017 to Extended European Search Report dated Apr. 12, 2017", w English Translation, 19 pgs.

"European Application Serial No. 13899687.1, Communication Pursuant to Article 94(3) EPC dated Apr. 12, 2018", 5 pgs.

"European Application Serial No. 13899687.1, Response filed Aug. 1, 2018 to Communication Pursuant to Article 94(3) EPC dated Apr. 12, 2018", 17 pgs.

"European Application Serial No. 13899687.1, Communication Pursuant to Article 94(3) EPC dated Nov. 27, 2018", 6 pgs.

"U.S. Appl. No. 15/024,933, Non Final Office Action dated Dec. 12, 2018", 17 pgs.

"Chinese Application Serial No. 201380081039.4, Office Action dated Jan. 22, 2019", w English translation, 33 pgs.

"European Application Serial No. 13899687.1, Response filed Mar. 6, 2019 to Communication Pursuant to Article 94(3) EPC dated Nov. 27, 2018", 10 pgs.

"U.S. Appl. No. 15/024,933, Response filed Mar. 12, 2019 to Non Final Office Action dated Dec. 12, 2018", 12 pgs.

"U.S. Appl. No. 15/024,933, Final Office Action dated May 16, 2019", 19 pgs.

"European Application Serial No. 13899687.1, Communication Pursuant to Article 94(3) EPC dated Jun. 14, 2019", 7 pgs.

"Chinese Application Serial No. 201380081039.4, Response filed Jun. 6, 2019 to Office Action dated Jan. 22, 2019", w English Claims, 11 pgs.

"Chinese Application Serial No. 201380081039.4, Office Action dated Jul. 9, 2019", W English Translation, 28 pgs.

"U.S. Appl. No. 15/024,933, Response filed Jul. 16, 2019 to Final Office Action dated May 16, 2019", 11 pgs.

"U.S. Appl. No. 15/024,933, Advisory Action dated Jul. 30, 2019", 3 pgs.

"European Application Serial No. 13899687.1, Response filed Sep. 17, 2019 to Communication Pursuant to Article 94(3) EPC dated Jun. 14, 2019", 12 pgs.

"European Application Serial No. 13899687.1, Summons to Attend Oral Proceedings mailed Oct. 11, 2019", 7 pgs.

"Chinese Application Serial No. 201380081039.4, Response filed Sep. 24, 2019 to Office Action dated Jul. 9, 2019", w English claims, 7 pgs.

"Chinese Application Serial No. 201380081039.4, Decision of Rejection dated Nov. 7, 2019", w o English Translation, 8 pgs.

* cited by examiner

SENSOR PLATFORM FOR GEOMETRIC PHYSICAL AREA

TECHNICAL FIELD

Embodiments described herein generally relate to sensors of a physical space and more specifically to a sensor platform for a geometric physical area.

BACKGROUND

A person may walk through a geometric physical area—such as a retailer location, store, shopping mall, grocery store, etc.—and interact (e.g., browse, carry, try on, sample, etc.) with articles (e.g., clothing, home goods, sporting goods, electronics, books, etc.) in the marketplace. In some examples, sensor systems installed at the geometric physical area may be used to track the person. Such tracking may include measurements (e.g., images from cameras) to detect when the person enters or leaves the geometric physical area.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Current geometric physical area analysis of person article interactions is generally non-existent or limited to noting purchase decisions of persons, for example at check-out, or person's entering or leaving the geometric physical area. Current geometric physical area observations, however, fail to provide insight into how persons interact with the articles of the geometric physical area. In some examples, electronic marketplaces (e.g., web sites from which goods may be purchased) attempt to track person interactions with presented materials, such as viewing times, clicks, etc., however, these interactions are limited to person interactions with elements that may be displayed in an electronic form and the interactions are likewise limited to those that may be measured from electronic inputs to the electronic marketplace.

The lack of information describing person interaction with articles in a geometric physical area causes difficulties for operators to improve the person's shopping experience. To address this issue, a sensor platform may be used to collect information of person interactions with articles in the geometric physical area. In an example, the sensor platform may process the collected information into actionable data. In an example, the actionable data may be used to improve the person's experience in the geometric physical area. In an example, the actionable data may be used to provide information (e.g., a document) which may promote sales in the geometric physical area, for example, by providing incentives to complete a sale, by featuring particular articles, etc. Thus, by observing person interactions with articles, the sensor platform may improve person experiences, and give operators greater options in productively running the geometric physical area.

For example, an article sensor (e.g., smart radio frequency identification (RFID) tag or other embedded devices) attached to clothing articles may connect with a shopper's smartphone when the shopper picks up the clothing article to look at it. Picking up the shirt may be the start of a "browsing event" between this shopper and this specific clothing article that may be logged. The browsing event may include information, such as, the duration of the contact, and the distance that the clothing article travels while connected with the shopper. The browsing event may be used to provide a framework for the retailer to offer real-documentation to accelerate the shopper's purchasing decision. For example, the platform may learn that a specific shopper spent eight minutes picking up several different colors of polo jerseys, spending the most time with navy blue, black, and gray. The shopper tried on a medium navy blue polo but not a black or gray polo. The shopper carried both the navy blue and gray polo jerseys through the store but only purchased the gray polo. Knowing this behavior, an incentive for the shopper to purchase a second polo would have probably been successful.

As used herein, a "geometric physical area" is a physical location in which articles are available for interactions by a person. Examples of geometric physical areas include stores, outlet centers, grocery stores, shopping malls, kiosks, service centers, physical markets (e.g., farmer's market, flee market, etc.), stalls, vehicles, such as a commercial airplane where a product purchase service is offered, etc. A geometric physical area is "entered" at a point when a person may interact with articles of the geometric physical area. Thus, in a traditional store, the geometric physical area is entered when a person steps inside the store. With respect to a kiosk or stall, the geometric physical area is entered when the person is close enough to observably interact with articles of the kiosk or stall. A geometric physical area is not a catalog, television/electronic service (e.g., such as an infomercial with telephone number), telephone based purchasing service, or electronic service (e.g., web site, mobile phone application, etc.). An interaction area of the geometric physical area is an area in which articles are displayed. The interaction area would not include, for example, a restroom, office, closet, etc. of a geometric physical area where those areas are not used for selling articles.

As used herein, an "article" is a thing (e.g., clothes, toys, sporting equipment, office supplies, electronics, books, music, etc.) or a service that is available for a person to use at a geometric physical area. A person is able to interact with an article or a proxy for the article at the geometric physical area. An article proxy may include such things as a demonstration model, a brochure (e.g., describing a vacation), a ticket (e.g., for an item too large to carry such as a large television, appliance, etc.), among other things. Either the article or the article proxy is physically available in the geometric physical area.

As used herein, a "person" is an entity (e.g., a person) that may enter the geometric physical area and interact with an article. In an example, the entity may be proxy for a person, such as a telepresence platform permitting a remote person to interact with the geometric physical area or articles over a distance. In an example, the person is a guest to the geometric physical area. A guest is not an employee, operator (e.g., owner), or servicer (e.g., contractor working on behalf of the operator), of the geometric physical area.

Figure 1:
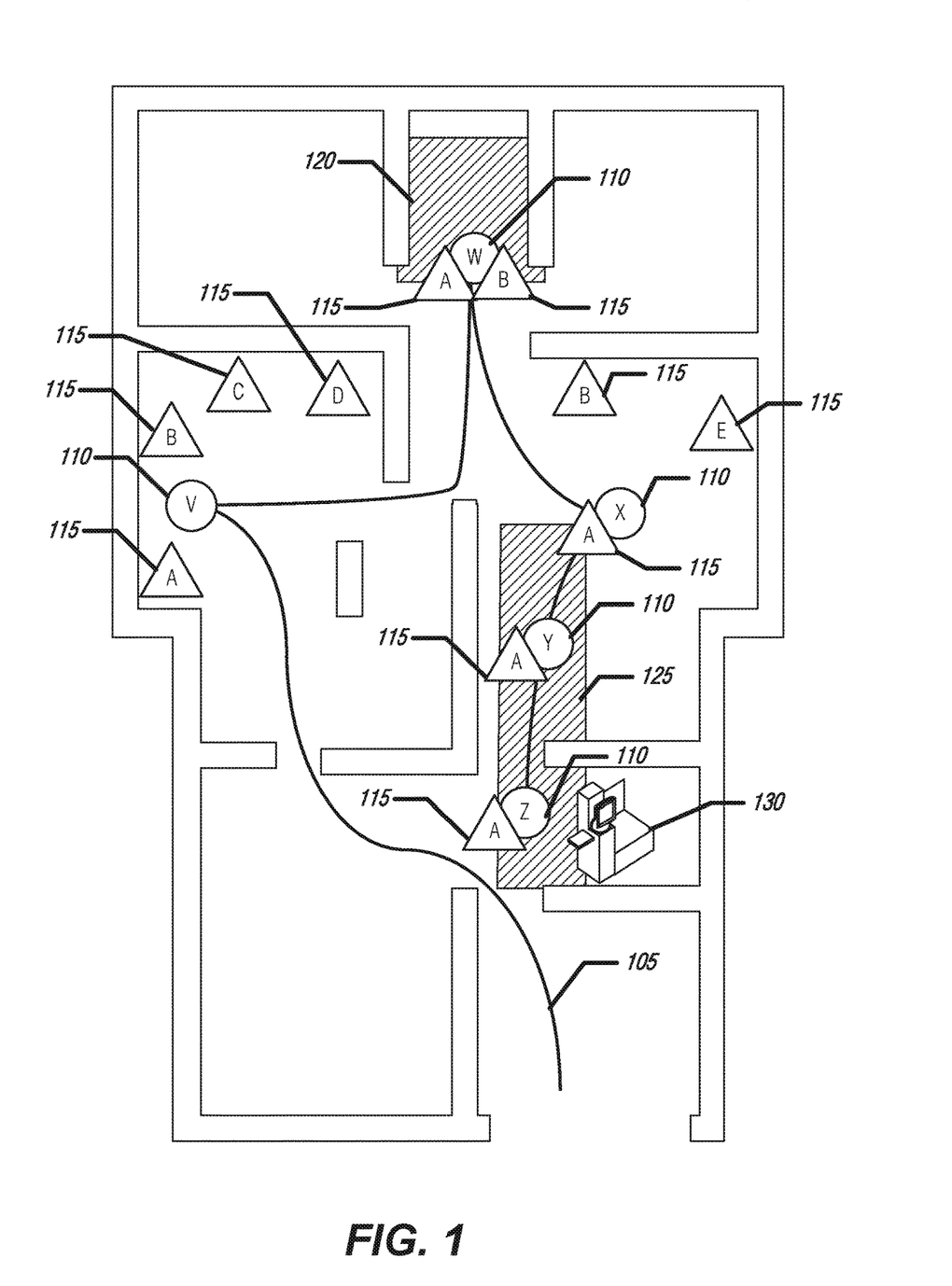
FIG. 1 illustrates an example of an environment for a sensor platform, according to an embodiment.

FIG. 1 illustrates an example of an environment 100 for a sensor platform. In this example of a geometric physical area, a person follows the path 105 after entering the geometric physical area. Along the path 105 are five points-of-interest (POI) 110 V, W, X, Y, and Z. Articles 115 A, B, C, D, and E are spread throughout the geometric physical area. The geometric physical area includes a POS 130.

After entering the geometric physical area, the person may be identified. Identification may prevent tracking of uninteresting parties, such as employees. In an example, identifying the person permits the sensor platform to record observed activity of the person for future analytics. The person may be tracked to POI 110 V. A POI 110 may be any pre-defined area in which a context of the person and article 115 may be inferred. For example, POI 110 V may be a display of pants, POI 110 W may be a dressing room, POI 110 X may be a re-stocking area, POI 110 Y may be a checkout line, and POI 110 Z may be the checkout at the POS 130. In an example, the POI 110 may refer to an area, such as the room of the POI 110 V. In an example, a geometric area may be defined, such as geometric area 120 corresponding to the POI 110 W and the geometric area 125 corresponding to the POI 110 Y or the POI 110 Z. In the area around POI 110 V are four articles A, B, C, and D. Thus, it may he inferred that the person is interacting with these articles 115 based on the person's position at the POI 110 V. A further person interaction with the articles 115 A and B may be inferred b the position of the articles 115 and the person at the POI 110 W (a dressing room). The observed context of proximity of the person and the articles 115 A and B at the dressing room may denote a greater interest in the articles 115 A and B for the person than for articles 115 C and D, to which the person was exposed based on the person's proximity to the POI 110 V. Another example observable context may be determined when, at the POI 110 X (re-stocking) it is noted that article 115 B is no longer with the person while article 115 A remains with the person. Thus, an inference that an attribute of article 115 A is more important to the person than some attribute of article 115 B may be made. The POI 110 Y is the checkout line. The duration of the person's stay in the checkout line may be measured. In an example, the longer the duration, the greater weight may be given to the article 115 A's attributes to indicate desire on the part of the person. The position of the article 115 A and the person at the POI 110 Z (checkout) allows an inference that the person intends to purchase the article 115.

Any mechanism by which the person and articles 115 are tracked may be used to implement the POI 110 mechanism described above. In an example, a location based service (LBS) of the geometric physical area may be used to determine the person's position or the position of any article 115. Other example location technologies may include satellite positioning systems (e.g., the Global Positing system), ground based radio systems (e.g., cellular telephone trilateration), chemical sensors, etc.

The proximity of the person at POI 110 V to articles 115 A and B provides a type of observed context between the person and these articles 115 in which person activity may be measured. Other example observed contexts may include manipulation of the article 115 by the person. For example, a smart RFID may provide proximity information to, for example, a mobile device of the person via its RFID functionality while also including an accelerometer to determine if the article 115 is picked up. A smart RFID is an example of an article sensor. An article sensor is any sensor in observable contact with a specific article 115 and capable of providing information of an interaction context. Example observable sensors may include, a scale (upon which the article rests), an eye tracker (to determine whether the person is looking at the article), a touch sensor (such as a capacitive arrangement on a conductive article to sense human touch), among others.

Figure 2:
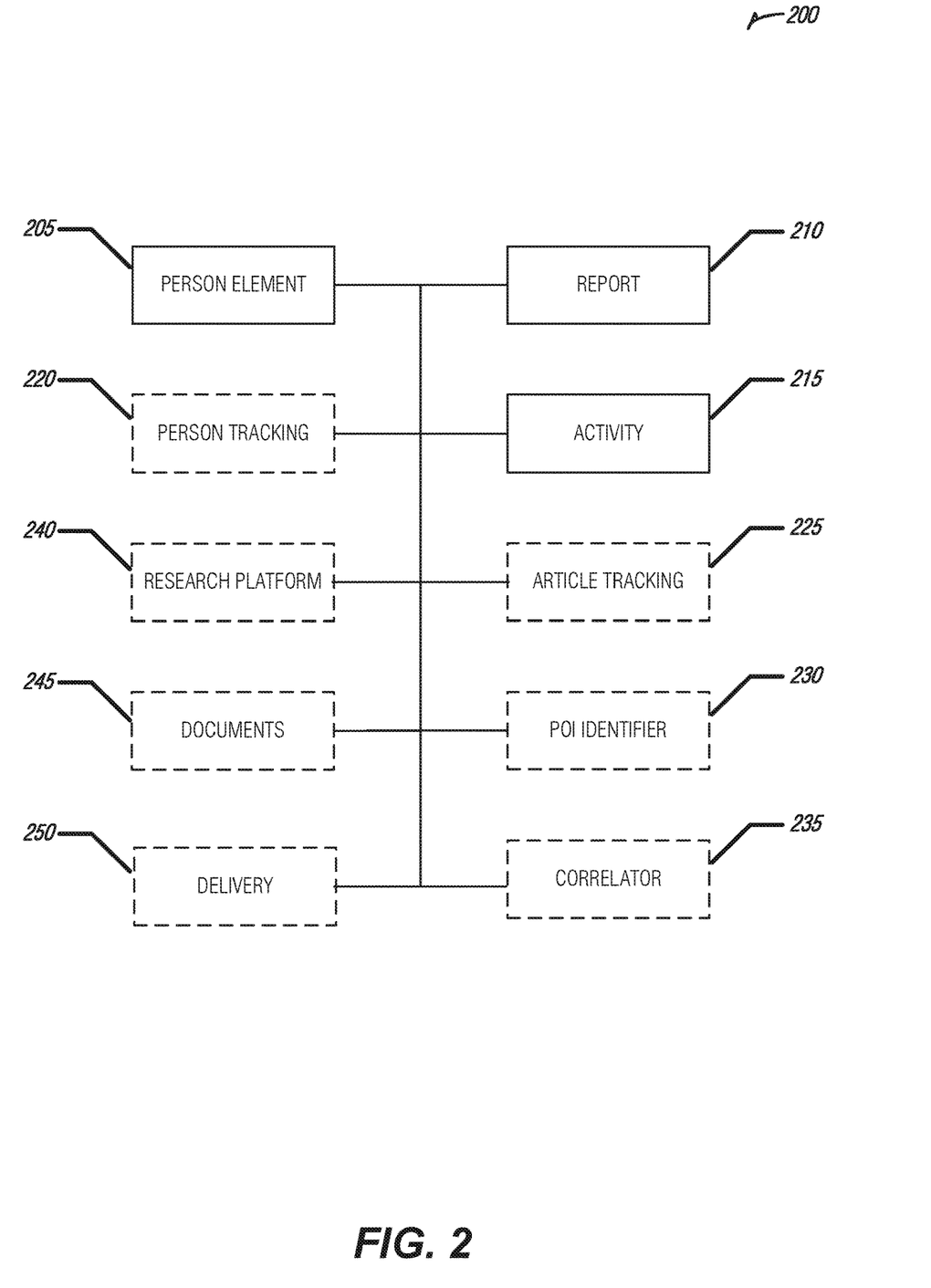
FIG. 2 illustrates a block diagram of an example of a sensor platform, according to an embodiment.

FIG. 2 illustrates a block diagram of an example of a sensor platform 200. The sensor platform 200 allows for use of observable context information of physical interactions between persons and articles, such as that described above, to enhance the person experience at the geometric physical area as well as provide tools for an operator of the geometric physical area to increase sales. The sensor platform 200 may include a person circuitry 205, a report circuitry 210, and an activity circuitry 215. These circuitries may be colocated on a single machine or separated from each other and be communicatively coupled when in operation (e.g., via a network).

The person circuitry 205 may he used to identify a person. In an example, identifying the person includes using a mobile device of the person. For example, the person's mobile device may include an application to connect to the sensor platform 200 (e.g., the person circuitry 205) and provide identification information, such as a person name, member ID, etc. In an example, identifying the person includes creating an anonymized identification of the person. Such an anonymized identification may include such information as an anonymous ID, demographic information (e.g., age, sex, job, etc.), time of day, day of month, etc. In an example, the anonymized identification is specific with respect to actions of the person and general with respect to a general identity of the person. For example, that the person picked up a particular plate pattern, carried a card of the set (e.g., an article proxy) to the register, and did not purchase the plates may be specifically attributed to the demographic information of the person, but not to the person himself.

In an example, identifying the person may include identifying a companion of the person. In this example, the observed context may include the companion. For example, it may be observed that a person is near another person. This proximity may be observed in different visits to the geometric physical area, or over an extended period during a single visit. Such companion identification may provide additional data to the observed context. For example, a pair shopping for flatware may allow the inference that they live together and suggest other items that may be of interest to them.

The activity circuitry 215 may be used to identify an article based on a physical relationship with the person. In an example, the physical relationship may include a distance between the article and the person. For example, if the person is within RFID range of the article, the article may be identified. In another example, if the person is at a display, articles in the display may be identified. In an example, the physical relationship may include the presence of the person and the article within a predetermined geometric shape, such as geometric shape 120 or 125 described above. Use of the geometric shape may solve some interaction ambiguities. For example, a person may take several articles to a dressing room but only allowed one at a time in a stall. That the articles may not be next to the person (e.g., out of RFID range) is inconsequential until either the person or the article leaves the area. This may also be true for checkout lines if, for example, a belt, valet, or other mechanism exists to convey the article to the POS outside of the person's possession. In an example, the predetermined geometric shape may be one of a plurality of geometric shapes defined for an interaction area including the article.

The activity circuitry 215 may also be used to determine a person activity with respect to the person and the article based on an observed context of the person and the article. An observed context includes information obtainable by the activity circuitry about the person and the article. For example, the observed context may include article position information. In an example, the position information may include a geospatial position relative to an interaction area including the article. In an example, the person activity may include physical possession of the article by the person and at least one of duration of possession or location of possession.

In an example, the position information may include an article arrangement. In an example, the article arrangement may include an orientation with respect to the person. For example, a flat article may be picked up and tilted into a more vertical orientation (e.g., so that the person may see it better). In an example, article arrangement may include, such things as an unfolding of the article, repositioning the article on a stand, etc. As noted here and above, article sensors or positioning systems may be used, among other things, to provide observed context information. In an example, a mobile device operated by the person may be used to identify the article (e.g., via RFID, scanning a bar code, etc.). In an example, the mobile device may be used to determine the person activity. For example, a smart RFID tag on a tool may communicate, via the mobile phone, that the tool is moving (e.g., via an accelerometer). This information may be passed to the activity circuitry 215 via the mobile device.

In an example, the activity circuitry 215 may include, or may interface with, an article tracking circuitry 225, a POI ID circuitry 230, and a correlation circuitry 235 to determine the person activity. The article tracking circuitry 225 may track the article in an interaction area. For example, the article may include a passive RFID tag. A series of RFID interrogators in a department may periodically interrogate RFID tags. By noting which interrogators may read a particular RFID tag, and knowing the positing of the interrogators within the interaction area, as position of the article may be ascertained. In an example, an article sensor may employ a location service (e.g., GPS, LBS, etc.) and report its position to the article tracking circuitry 225. In an example, a camera system may provide still or video images that may be processed to identify the article. Knowing the interaction area positions any given view covers provides a location of the article.

The person tracking circuitry 220 may track the person in the interaction area. The person tracking circuitry 220 is distinguishable from the person circuitry 205 in that the first determines person position within the geometric physical area while the second is concerned with personal information about the person. The person tracking circuitry 220 may employ any of the techniques described above with respect to article tracking. In an example, the mobile device of the person is employed to aid in the person tracking. In an example, the mobile device provides the person's position.

The POI ID circuitry 230 may identify a POI in the interaction area. For example, the POI IS circuitry 230 may provide an interface in which a POI is defined. Such an interface may provide for the identification of an area (e.g., sporting goods) or a geometric shape.

The correlation circuitry 235 may note a confluence of the article, the person, and the POI. For example, the person and the article may be tracked separately by the article tracking circuitry 225 and the person tracking circuitry 220 respectively. Observing that the article and person moved together into a POI may allow the inference that the person is in possession of the article. This may still, however, not be sufficient to determine other ways in which the person is interacting with the article. In this example, the POI may be used to provide additional interaction information. For example, if the person is observed with the article at a dressing room and also at checkout, it may be inferred that the person tried on the article and is willing to buy the article.

The report circuitry 210 may report on the person activity. In an example, reporting the person activity may include adding an event to a browsing history for the person. In an example, the browsing history may be maintained by the person circuitry 205. The browsing history may include person activity data indexed by visits of the person to the geometric physical area. In an example, the browsing history may include information about person visits to other geometric physical areas. In an example, the browsing history may include a correlation model to identify other persons similar to the person. In an example, these other person's browsing history may be used to supplement the person's browsing history.

In an example, reporting the person activity may include communicating the activity to a research platform 240. In an example, reporting to the research platform 240 may include anonymizing the person. Such communications may provide an additional revenue stream for the physical market place. In an example, the research platform 240 may aggregate person activity data for a particular article or class of articles. In an example, the research platform 240 may communicate activity information to third parties, such as article manufacturers, other retailers, etc.

In an example, reporting the person activity may include communicating the activity to an documents platform 245. In an example, a delivery circuitry 250 may be used to deliver a document, such as a purchase incentive to the person from the documents platform. In an example, the purchase incentive may be delivered to a mobile device of the person.

Example purchase incentives may include a discount on the article, notification of a complimentary article (e.g., jewelry to match shirt, knife block to match knife, etc.), coupon on unrelated service (e.g., free car wash at another retailer for purchasing vacation), etc. In an example, the purchase incentive may include representations of other articles of interest to the person based on a browsing history of the person. For example, a person who has bought jeans in the past may be presented with an advertisement for a new brand of jeans being offered at the geometric physical area. In an example, the purchase incentive may include a map of the interaction area indicating locations for the other articles, such as the jeans. In another example, a person observed interacting with a shirt may be presented other articles to complete an outfit. The map would indicate the locations of the other articles comprising the ensemble.

In an example, the purchase incentive may be selected from a plurality of purchase incentives based on an identified companion of the person. For example, a person with a partner identified as a companion near a holiday may be offered a romantic article in the purchase incentive. In another example, a person with a companion identified as a child may be offered a purchase incentive for a toy, for example, near the companion's birthday.

In an example, the purchase incentive may be selected based on a predictive analytic. A predictive analytic is a model designed to predict future behavior based on current behavior. Examples ma.y include models based on age, socio-economic status, taste profiles, etc. In an example, the predictive analytic may be derived from a browsing history of the person.

Figure 3:
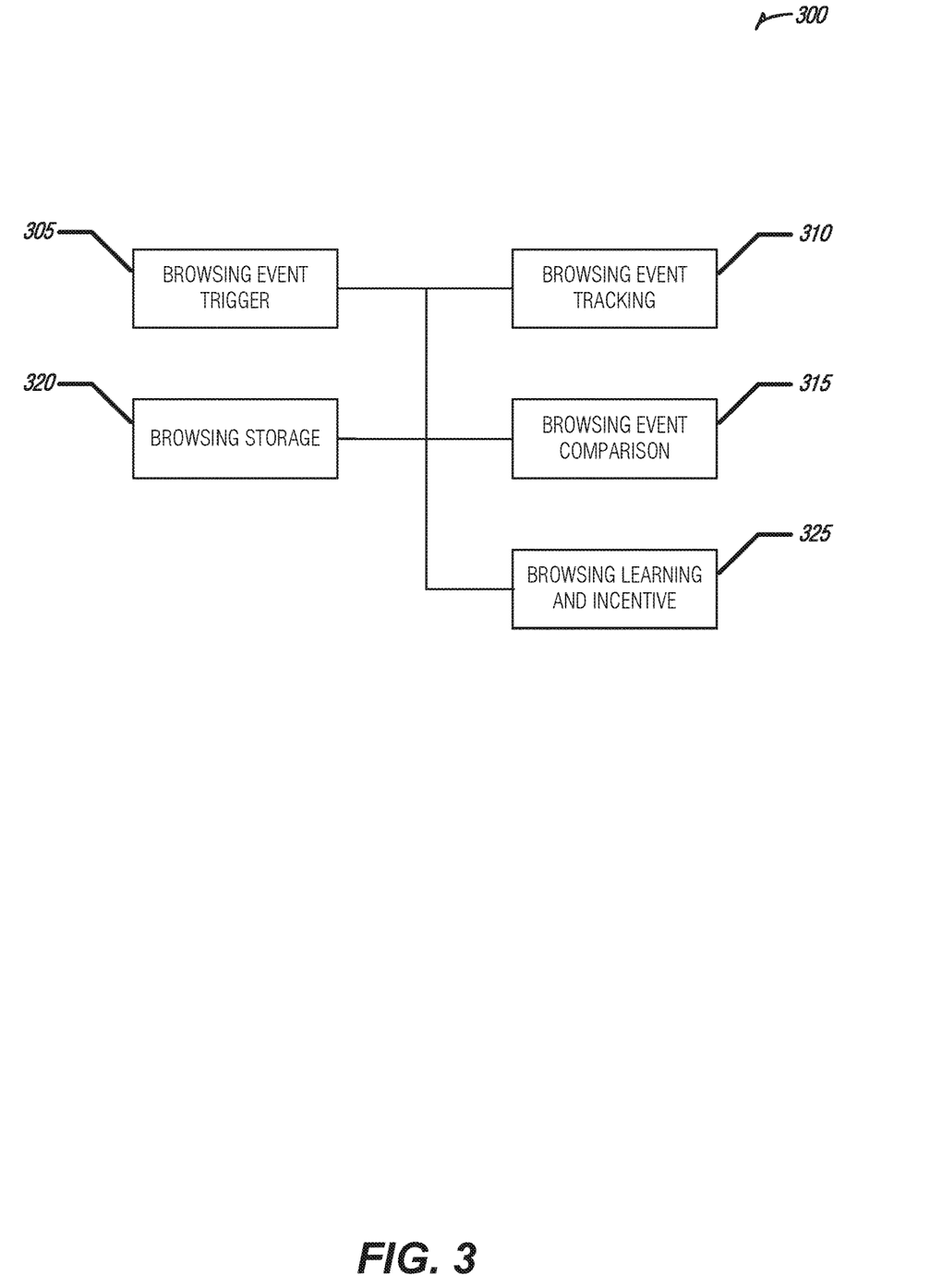
FIG. 3 illustrates a block diagram of an example of a sensor platform, according to an embodiment.

FIG. 3 illustrates a block diagram of an example of a sensor platform 300. The platform 300 includes a variation on task separation from that discussed above with respect to the platform 200. The platform 300 generally separates tasks along a browsing event. A browsing event is a period and corresponding activity between a person and an article. For example, a browsing event may begin when the person looks at an article and end when the person puts the article down or purchases the article. In an example, browsing events may be subdivided into discrete browsing actions. For example, a person picking up an article may be a first browsing action and the person turning the shirt over may be a second browsing action. The platform 300 may include a browsing event trigger circuitry 305, a browsing event tracking circuitry 310, a browsing event storage circuitry 320, a browsing event comparison circuitry 315, and a browsing learning and incentive circuitry 325.

The browsing event trigger circuitry 305 may interface between article sensors and a person's mobile device to determine whether the person is interacting with the article. Once it is determined that an interaction is taking place, the browsing event trigger circuitry 305 initiates a browsing event.

The browsing event tracking circuitry 310 may track data of the browsing event. In an example, the tracked data may include a duration of the browsing event. In an example, the tracked data may include a distance that the person travels with the article. In an example, geospatial tracking information from an LBS of the geometric physical area may be part of the tracked data.

The browsing storage circuitry 320 may store browsing information. In an example, the browsing information may include one or more of, the person, the article that was browsed, purchase tendencies of the person, relationship between browsing events and purchase decisions, etc. The browsing storage circuitry 320 acts as a data repository from whence additional browsing analytics may be derived and stored for future use.

The browsing event comparison circuitry 315 may compare an on-going (e.g., real-time) browsing event with historic characteristics (e.g., behaviors) of persons (e.g., the current person of the on-going browsing event) to determine a predictive analytic for the browsing event. Thus, the browsing event comparison circuitry 315 may bridge the gap between historical knowledge and current activities to identify a model for the current activity.

The browsing learning and incentive circuitry 325 may use the determined predictive analytic from the browsing event comparison circuitry 315 to enact an incentive designed to accelerate the person's decision to purchase an article. For example, the browsing learning and incentive circuitry 325 may determine—e.g., based on the data mining of shopper's previous physical store browsing characteristics, and purchase results—whether the best timing for an incentive for this specific shopper is when they first pick up the clothing article or after they try it on in the changing room. In an example, the browsing learning and incentive circuitry 325 may determine that the incentive worked in an unexpected manner (e.g., was more successful or less successful than predicted) and modify the predictive analytic to account for the variance. For example, an incentive that suggested an add-on item of a tie when a sport coat is being browsed, may be changed when suggesting the tie rarely results in a sale (e.g., when fashions change).

The following is an example of a scenario using the browsing event centric arrangement described above with respect to the sensor platform 300. Chris is shopping in the local clothing store, looking to buy a summer jersey. He is looking at the display of summer jerseys. He scans the various jerseys on the display table, and spots one that he likes. He picks it up off of the display table. The article sensor in the jersey detects that the jersey has been picked up off of the display table and connects with Chris' smartphone to start a browsing event. This is transmitted via the smartphone to the sensor platform 300 resident in the clothing store's private cloud where Chris's physical store browsing and purchase history are accessed.

The sensor platform 300 may measure the duration that Chris holds onto the jersey, as well as whether Chris moves the jersey from the table and carries it to another location in the store to a location, such as a dressing (e.g., changing) room. Using a predictive analytic, the sensor platform 300 determines Chris' affinity (e.g., buying desire) for the jersey by the duration of time that Chris holds the jersey and if Chris takes the jersey away from the display table. The sensor platform 300 sends (via text message, etc.) a real time incentive to Chris to buy the jersey in his hand now. Based on Chris' historical browsing and purchasing data at the clothing store, the sensor platform 300 determines that once Chris tries on a piece of clothing, or otherwise holds on to the clothing article for longer than two minutes and ten seconds, he will make a purchase with 87% probability. Therefore the sensor platform 300 offers him a 15% coupon incentive when he picks up the jersey and holds it for longer than 20 seconds.

In a further example of a scenario using the browsing event centric arrangement described above with respect to the sensor platform 300, Erin is shopping at the clothing store and is looking for a new pair of jeans. She takes a pair of jeans that she is interested in from the rack. As in the example with Chris, the sensor platform 300 logs a browsing event. The sensor platform 300 uses Erin's physical store browsing and purchasing records. The sensor platform 300 determines that she has previously looked at (e.g., triggered browsing events) several shirts and other tops. The sensor platform 300 texts Erin a real-time offer for a 30% discount if she buys the jeans that she is looking at, and a matching shirt and socks which she has looked at in a previous visit.

Figure 4:
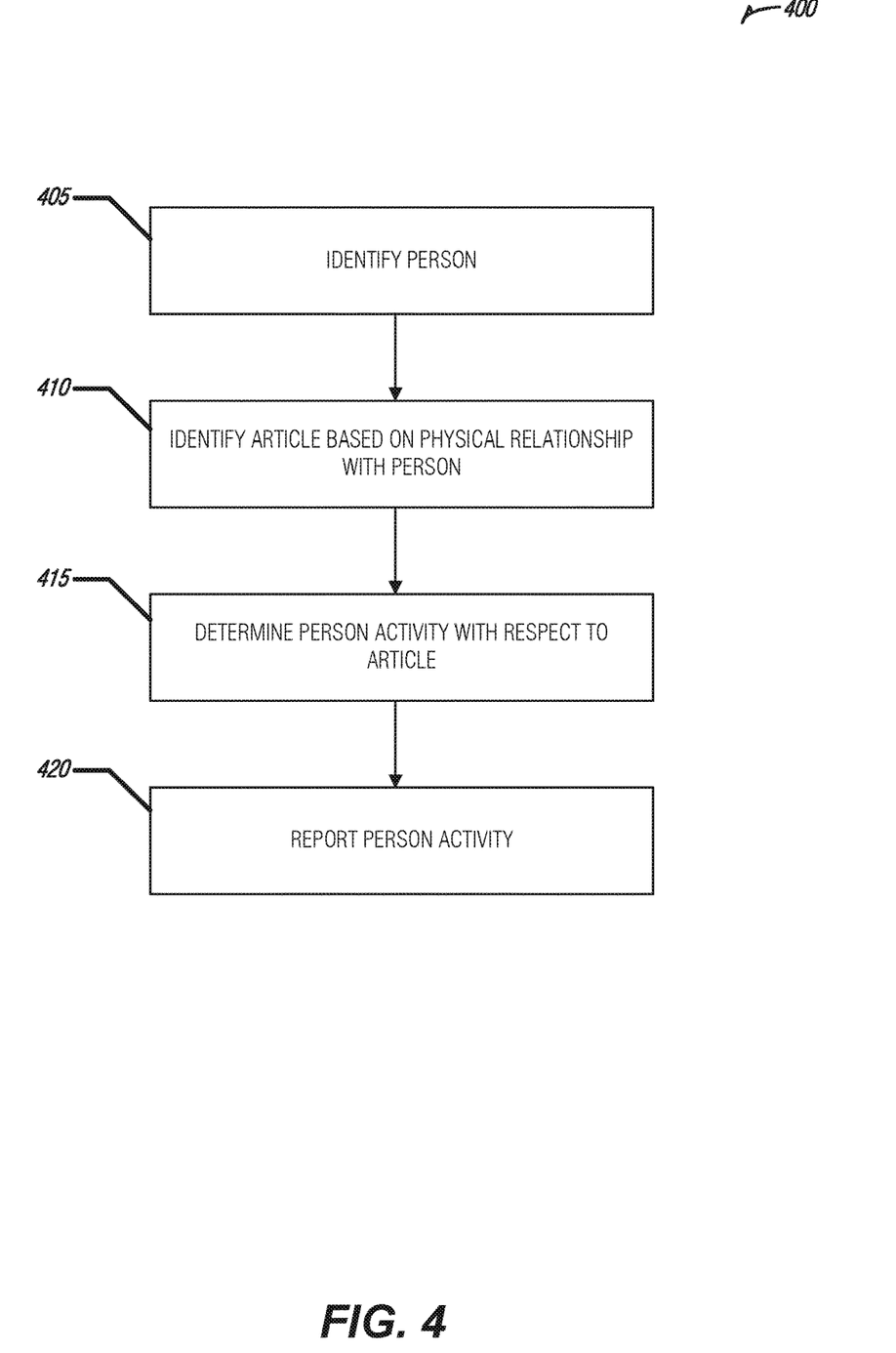
FIG. 4 illustrates a flowchart of an example of a method to implement a sensor platform, according to an embodiment.

FIG. 4 illustrates a flowchart of an example of a method 400 to implement a sensor platform.

At operation 405, a person may be identified. In an example, identifying the person may include using a mobile device operated by the person. In an example, identifying the person may include creating an anonymized identification for the person. In an example the anonymized identification is specific with respect to actions of the person and general with respect to a general identify of the person. In an example, identifying the person may include identifying a companion of the person.

At operation 410, an article may be identified based on a physical relationship with the person. In an example, the physical relationship may include the distance between the article and the person. In an example, the physical relationship may include inclusion of both the person and the article within a predetermined geometric shape. In an example, the predetermined geometric shape may be one of a plurality of geometric shapes defined for an interaction area. including the article.

At operation 415, a person activity with respect to the person and the article may be determined based on an observed context of the person and the article. In an example, the observed context may include article position information. In an example, the article position information may include a geospatial position relative to an interaction area including the article. In an example, the article position information may include an article arrangement. In an example, the article arrangement may include an orientation with respect to the person. In an example, the observed context may include the companion. In an example, the person activity may include physical possession of the article by the person. In an example, the person activity may include a duration of possession. In an example, the person activity may include a location of possession. In an example, the person activity may include a manipulation (e.g., holding, touching, wearing etc.) of the article by the person.

In an example, identifying the article and determining the person activity may be performed by a mobile device operated by the person. For example, the mobile device may identify the article via near field communications when the person touches the article with the mobile device. Further, the mobile device may report a picture of the article taken by the person and, for example, sent to a companion (e.g., a spouse).

In an example, determining the person activity may include tracking the article in an interaction area, tracking the person in the interaction area, identifying a POI in the interaction area, and noting a confluence of the article, the person, and the POI.

At operation 420, the person activity may be reported. In an example, reporting the person activity may include adding an event to a browsing history for the person. In an example, reporting the person activity includes communicating the activity to a research platform. In an example, reporting the person activity to the research platform may include anonymizing the person.

In an example, reporting the person activity may include communicating the activity to a documents platform.

In an example, the method 400 may comprise delivering a purchase incentive to the person from the documents platform. In an example, the purchase incentive may be delivered to a mobile device of the person. In an example, the purchase incentive may include representations of other articles of interest to the person based on a browsing history of the person. In an example, the purchase incentive may include a map of an interaction area. The map may indicate locations for the other articles.

In an example, the purchase incentive may be selected from a plurality of purchase incentives based on the companion. In an example, the purchase incentive may be selected based a predictive analytic. In an example, the predictive analytic may be derived from a browsing history of the person.

Figure 5:
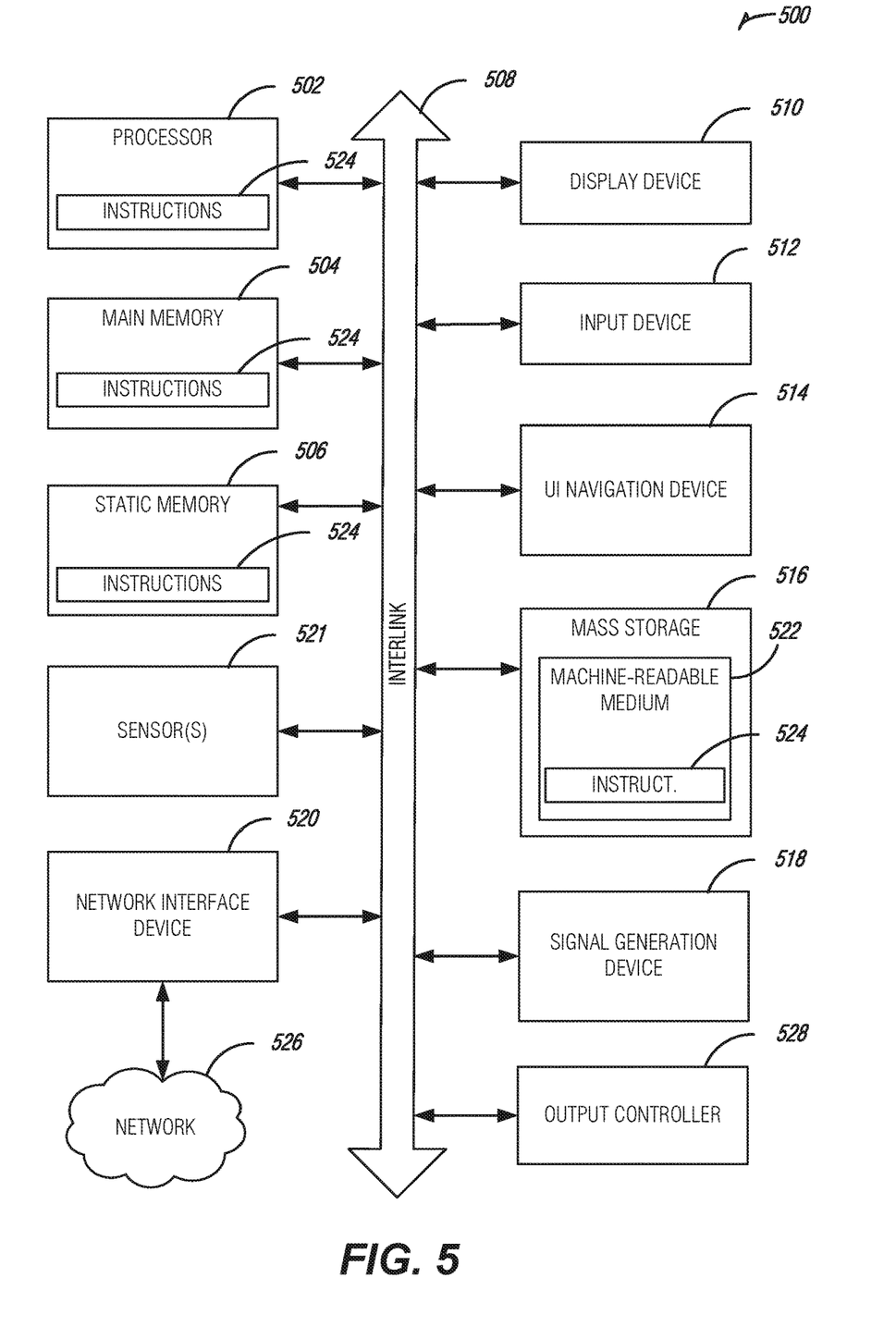
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on circuitry (e.g., processing circuitry), such as logic or a number of components, modules, or mechanisms. Circuitry comprises are tangible entities (e.g., hardware) capable of performing specified operations when operating. Thus, circuitry A is hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one circuit at one point in time or differing points in time. For example, under operation, the execution units may be configured by a first set of instructions to be a part of a first circuit at one point in time and reconfigured by a second set of instructions to be a part of a second circuit.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a person interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), person datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & Examples

Example 1 is a sensor platform for a geometric physical area, the sensor platform comprising: an interface to receive: location information for a person in the geometric physical area from a location based service (LBS); identifying information about the person from a device carried by the person; identifying information about a companion of the person; a context for an article in the geometric physical area; and identifying information about the article; and circuitry to: correlate the article to the person based on a physical relationship between the person and the article taken from the location information for the person and the context for the article; retrieve a document from an external machine using the identifying information about the person, the identifying information about the companion, the identifying information about the article, the context, and the correlation of the article to the person; and transmit the document to the device carried by the person.

In Example 2, the subject matter of Example 1, wherein the device carried by the person is a mobile device operated by the person.

In Example 3, the subject matter of any of Examples 1-2, wherein the identifying information about the person is an anonymized identification, the anonymized identification specific with respect to actions of the person and general with respect to a general identify of the person.

In Example 4, the subject matter of any of Examples 1-3, wherein the physical relationship includes at least one of: a distance between the article and the person; or inclusion of both the person and the article within a predetermined geometric shape, the predetermined geometric shape being one of a plurality of geometric shapes defined for the geometric physical area including the article.

In Example 5, the subject matter of any of Examples 1-4, wherein the context includes at least one of: a geospatial position of the article relative to an area including the article; or an article arrangement of the article that includes an orientation with respect to the person.

In Example 6, the subject matter of any of Examples 1-5, wherein the device carried by the person identifies the article and measures activity of the person.

In Example 7, the subject matter of any of Examples 1-6, wherein the document includes representations of other articles of interest to the person.

In Example 8, the subject matter of Example 7, wherein the document includes a map of a geometric physical area, the map indicating locations for the other articles.

Example 9 is a non-transitory machine-readable medium including instructions that, when executed by circuitry of a sensor platform of a geometric physical area, cause the circuitry to perform operations comprising: receiving location information for a person in the geometric physical area from a location based service (LBS); receiving identifying information about the person from a device carried by the person; receiving identifying information about a companion of the person; receiving a context for an article in the geometric physical area; receiving identifying information about the article; correlating the article to the person based on a physical relationship between the person and the article taken from the location information for the person and the context for the article; retrieving a document from an external machine using the identifying information about the person, the identifying information about the companion, the identifying information about the article, the context, and the correlation of the article to the person; and transmitting the document to the device carried by the person.

In Example 10, the subject matter of Example 9, wherein the device carried by the person is a mobile device operated by the person.

In Example 11, the subject matter of any of Examples 9-10, wherein the identifying information about the person is an anonymzed identification, the anonymized identification specific with respect to actions of the person and general with respect to a general identify of the person.

In Example 12, the subject matter of any of Examples 9-11, wherein the physical relationship includes at least one of: a distance between the article and the person; or inclusion of both the person and the article within a predetermined geometric shape, the predetermined geometric shape being one of a plurality of geometric shapes defined for the geometric physical area including the article.

In Example 13, the subject matter of any of Examples 9-12, wherein the context includes at least one of: a geospatial position of the article relative to an area including the article; or an article arrangement of the article that includes an orientation with respect to the person.

In Example 14, the subject matter of any of Examples 9-13, wherein the device carried by the person identifies the article and measures activity of the person.

In Example 15, the subject matter of any of Examples 9-14, wherein the document includes representations of other articles of interest to the person.

In Example 16, the subject matter of Example 15, wherein the document includes a map of a geometric physical area, the map indicating locations for the other articles.

Example 17 is a method performed by a sensor platform for a geometric physical area, the method comprising: receiving location information for a person in the geometric physical area from a location based service (LBS); receiving identifying information about the person from a device carried by the person; receiving identifying information about a companion of the person; receiving a context for an article in the geometric physical area; receiving identifying information about the article; correlating the article to the person based on a physical relationship between the person and the article taken from the location information for the person and the context for the article; retrieving a document from an external machine using the identifying information about the person, the identifying information about the companion, the identifying information about the article, the context, and the correlation of the article to the person; and transmitting the document to the device carried by the person.

In Example 18, the subject matter of Example 17, wherein the device carried by the person is a mobile device operated by the person.

In Example 19, the subject matter of any of Examples 17-18, wherein the identifying information about the person is an anonymized identification, the anonymized identification specific with respect to actions of the person and general with respect to a general identify of the person.

In Example 20, the subject matter of any of Examples 17-19, wherein the physical relationship includes at least one of: a distance between the article and the person; or inclusion of both the person and the article within a predetermined geometric shape, the predetermined geometric shape being one of a plurality of geometric shapes defined for the geometric physical area including the article.

In Example 21, the subject matter of any of Examples 17-20, wherein the context includes at least one of: a geospatial position of the article relative to an area including the article; or an article arrangement of the article that includes an orientation with respect to the person.

In Example 22, the subject matter of any of Examples 17-21, wherein the device carried by the person identifies the article and measures activity of the person.

In Example 23, the subject matter of any of Examples 17-22, wherein the document includes representations of other articles of interest to the person.

In Example 24, the subject matter of Example 23, wherein the document includes a map of a geometric physical area, the map indicating locations for the other articles.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not he used to interpret or limit the scope or meaning of the claims. Also, in the above Detailed Description, various features may he grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A sensor platform for a geometric physical area, the sensor platform comprising:
an interface to receive:
location information for a person in the geometric physical area from a location based service (LBS);
identifying information about the person from a device carried by the person;
identifying information about a companion of the person;
a context for an article in the geometric physical area; and
identifying information about the article; and
circuitry to:
correlate the article to the person based on a physical relationship between the person and the article taken from the location information for the person and the context for the article;
retrieve a document from an external machine using the identifying information about the person, the identifying information about the companion, the identifying information about the article, the context, and the correlation of the article to the person; and
transmit the document to the device carried by the person.

2. The sensor platform of claim 1, wherein the device carried by the person is a mobile device operated by the person.

3. The sensor platform of claim 1, wherein the identifying information about the person is an anonymized identification, the anonymized identification specific with respect to actions of the person and general with respect to a general identify of the person.

4. The sensor platform of claim 1, wherein the physical relationship includes at least one of:
a distance between the article and the person; or
inclusion of both the person and the article within a predetermined geometric shape, the predetermined geometric shape being one of a plurality of geometric shapes defined for the geometric physical area including the article.

5. The sensor platform of claim 1, wherein the context includes at least one of:
a geospatial position of the article relative to an area including the article; or
an article arrangement of the article that includes an orientation with respect to the person.

6. The sensor platform of claim 1, wherein the device carried by the person identifies the article and measures activity of the person.

7. The sensor platform of claim 1, wherein the document includes representations of other articles of interest to the person.

8. The sensor platform of claim 7, wherein the document includes a. map of a geometric physical area, the map indicating locations for the other articles.

9. A non-transitory machine-readable medium including instructions that, when executed by circuitry of a sensor platform of a geometric physical area, cause the circuitry to perform operations comprising:
receiving location information for a person in the geometric physical area from a location based service (LBS);
receiving identifying information about the person from a device carried by the person;
receiving identifying information about a companion of the person;
receiving a context for an article in the geometric physical area;
receiving identifying information about the article;
correlating the article to the person based on a physical relationship between the person and the article taken from the location information for the person and the context for the article;
retrieving a document from an external machine using the identifying information about the person, the identifying information about the companion, the identifying information about the article, the context, and the correlation of the article to the person; and
transmitting the document to the device carried by the person.

10. The non-transitory machine-readable medium of claim 9, wherein the device carried by the person is a mobile device operated by the person.

11. The non-transitory machine-readable medium of claim 9, wherein the identifying information about the person is an anonymized identification, the anonymized identification specific with respect to actions of the person and general with respect to a general identify of the person.

12. The non-transitory machine-readable medium of claim 9, wherein the physical relationship includes at least one of:
a distance between the article and the person; or
inclusion of both the person and the article within a predetermined geometric shape, the predetermined geometric shape being one of a plurality of geometric shapes defined for the geometric physical area including the article.

13. The non-transitory machine-readable medium of claim 9, wherein the context includes at least one of:
a geospatial position of the article relative to an area including the article; or
an article arrangement of the article that includes an orientation with respect to the person.

14. The non-transitory machine-readable medium of claim 9, wherein the device carried by the person identifies the article and measures activity of the person.

15. The non-transitory machine-readable medium of claim 9, wherein the document includes representations of other articles of interest to the person.

16. The non-transitory machine-readable medium of claim 15, wherein the document includes a map of a geometric physical area, the map indicating locations for the other articles.

17. A method performed by a sensor platform for a geometric physical area, the method comprising:
receiving location information for a person in the geometric physical area from a location based service (LBS);
receiving identifying information about the person from a device carried by the person;
receiving identifying information about a companion of the person;
receiving a context for an article in the geometric physical area;
receiving identifying information about the article;
correlating the article to the person based on a physical relationship between the person and the article taken from the location information for the person and the context for the article;

retrieving a document from an external machine using the identifying information about the person, the identifying information about the companion, the identifying information about the article, the context, and the correlation of the article to the person; and transmitting the document to the device carried by the person.

18. The method of claim 17, wherein the context includes at least one of:

a geospatial position of the article relative to an area including the article; or an article arrangement of the article that includes an orientation with respect to the person.

19. The method of claim 17, wherein the document includes representations of other articles of interest to the person.

20. The method of claim 19, wherein the document includes a map of a geometric physical area, the map indicating locations for the other articles.

\* \* \* \* \*

UNITED STATES PATENT AND TRADEMARK OFFICE
CERTIFICATE OF CORRECTION

Page 1 of 1

| | |
|---|---|
| PATENT NO. | : 10,659,926 B1 |
| APPLICATION NO. | : 16/654996 |
| DATED | : May 19, 2020 |
| INVENTOR(S) | : Stanasolovich et al. |

It is certified that error appears in the above-identified patent and that said Letters Patent is hereby corrected as shown below:

On the Title Page

In item (22), in "Prior Publication Data", in Column 1, Line 1, after "2019", insert
--¶(65) Prior Publication Data
US 2020/0178032 A1 Jun. 04, 2020--

In the Claims

In Column 15, Line 59, in Claim 8, delete "a." and insert --a-- therefor

Signed and Sealed this
Fifth Day of January, 2021

Andrei Iancu
*Director of the United States Patent and Trademark Office*